United States Patent Office 3,759,794
Patented Sept. 18, 1973

3,759,794
METHOD FOR DETERMINATION OF AMYLASE ACTIVITY
Sylvan M. Sax, 6490 Monitor St., Pittsburgh, Pa. 15217; John J. Moore, 1807 Park Circle Drive, Glenshaw, Pa. 15116; and Anna B. Bridgwater, 273 S. Winebiddle St., Pittsburgh, Pa. 15224
No Drawing. Filed Nov. 1, 1971, Ser. No. 194,667
Int. Cl. G01n 31/14
U.S. Cl. 195—103.5 R     6 Claims

ABSTRACT OF THE DISCLOSURE

A method for the determination of amylase activity comprising the preparation of a substrate by treating amylopectin with a dichloro-s-triazine dye, buffering same, then mixing the serum, urine, or other body fluid to be tested with the substrate, providing a predetermined incubation period, then adding ethylene glycol monomethyl ether to the incubated material, followed by the addition of zinc sulfate solution, and then determining the absorbance of the reacted substrate.

BACKGROUND AND SUMMARY OF THE INVENTION

This invention relates in general to diagnostic analytical procedures and, more particularly, to a method for determination of amylase activity, as in the diagnosis for pancreatitis.

It is an object of the present invention to provide a method of the character stated, the performance of which is productive of a relatively sensitive assay of amylase activity in serum, urine, and the like.

It is a further object of the present invention to provide a method for the determination of amylase activity which may be effected with the utilization of presently available laboratory equipment and, hence, amenable to ready practice by laboratory technicians.

It is another object of the present invention to provide a method for the determination of amylase activity comprehending the use of precipitating agents which conduce to a clarity and a chromogenicity of the final solution which are not sensitive to small changes in temperature or concentrations of the various constituents of the incubation mixture.

It is a further object of the present invention to provide a method for the determination of amylase which exhibits relatively higher sensitivity than that produced by currently practiced methods, such as the saccharogenic method.

It is a further object of the present invention to provide a substrate for the use in the present method which has a relatively high shelf life so as to be useful over an extended period of time, eliminating the necessity of frequent substrate preparations.

It is another object of the present invention to provide a method for determining amylase activity, the practice of which produces clear supernatants and provides a reliability in batch to batch consistency of substrate.

It is a still further object of the present invention to provide a method of the type stated wherein constituents within the body fluid to be tested such as serum and urine, do not cause interference so that the preparation of specimen blanks is obviated.

DESCRIPTION OF THE INVENTION

The essence of this invention is preparing a substrate comprising a dye having a dichloro-s-triazine reactive group, amylopectin, and a buffering agent, then intermixing with the substrate the serum, urine, or other specimen to be tested, and, after incubation for a predetermined period, adding ethylene glycol monomethyl ether and zinc sulfate solution as precipitants. Spectrophotometric means are then utilized for determining the activity of the amylase within the resulting solution in dye units.

In order to practice the method of the present invention, there is initially prepared the particular requisite substrate, as well as the required reagents for ultimate sequential utilization. The substrate of this method comprises amylopectin treated with a dichloro-s-triazine dye in like proportions and under the same conditions as described for the dye-labelling of a variety of polysaccharadies.*

The dichloro-s-triazine dyes utilized in preparing the substrate have a molecular weight of approximately 700 and structurally comprise a chromophore which may be either an azo or anthraquionone moiety. In commercial form these compounds have a purity of about 65% and are especially appropriate for the present method in view of their relatively high color yield per unit weight and for their ability to produce substrates displaying sensitivity toward pancreatic amylase.

Demonstrative of such dyes are the following compounds:

(a) $C_{19}H_9Cl_2N_6O_{10}S_3Na_3$ which is a red dye known as 5 - [(4,6 - dichloro - s - triazin - 2 - yl) amino] - 4-hydroxy-3 [(2-sulfophenyl)azo] - 2,7 - naphthalenedisulfonic acid, trisodium salt. This compound has the following structural formula:

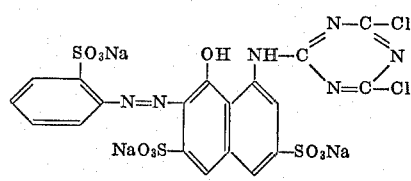

(b) $C_{23}H_{12}Cl_2N_6O_8S_2Na_2$ which is a blue dye known as 1 - amino - 4 [3 - [(4,6 - dichloro - s - triazin - 2 - yl) amino]-4-sulfoanilo] - 9,10 - dihydro - 9,10 - dioxo - 2-anthracenesulfonic acid, disodium salt. This compound has the following structural formula:

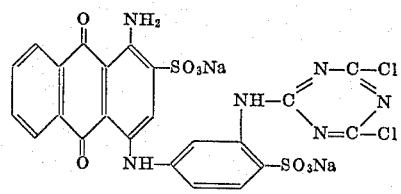

(c) $C_{20}H_{12}Cl_2N_6O_7S_2Na_2$ which is a scarlet dye known as 7 - [(4,6 - dichloro - s - triazin - 2 - yl)amino] - 3-[(4-methoxy - 2 - sulfophenyl)azo] - 2 - naphthalenesulfonic acid, disodium salt. This compound has the following structural formula:

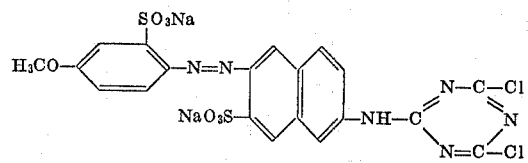

As will be seen the first and third each have an azo chromophore while the second one mentioned contains an anthraquionone as the chromophore. It is of course apparent that for the spectrophotometry a variation in wave lengths is necessarily involved with the same being respectively for the above mentioned dyes 517, 637, 498

---
*Dudman, W. F. and Bishop, C. T., "Electrophoresis of Dyed Polysacch-Darides on Cellulose Acetate," Can. J. Chem. 46, 3079 (1968).

nanometers. The method for measuring amylase activity in accordance with the following is effected in the same manner regardless of which dichloro-s-triazine is utilized, but expectedly, with the use of the appropriate wavelengths for performing spectrophotometry.

The amylopectin may be obtained from corn, wheat or potato starch, but the corn amylopectin identified by the term RAMALIN G** has been found of particular suitability. It is understood that unmodified starch, amylose, or glycogen may be substituted for amylopectin.

The dyed amylopectin may be prepared in the following manner:

Place 3000 ml. of water in a 3-neck, 5-l. flask, fitted with a paddle stirrer, thermometer, and heating mantle. Heat to 40° and maintain. Dissolve 5 grams of Procion Brilliant Red M–2BS in the heated water, and then add 50 grams of amylopectin and stir for 5 minutes. 150 grams of NaCl is next added with stirring for 30 minutes. Then add 22 grams of $Na_2CO_3$ and, after several minutes, observe the pH. Additional $Na_2CO_3$, 2 grams at a time, is dissolved in order to bring the pH to 10.5–10.6. Stirring is then undertaken for an additional hour, after which the heat is removed and the solution permitted to stand overnight.

Afterwards nine 200-gram portions of $(NH_4)_2SO_4$ are added with stirring, which is continued for an additional 20 minutes. Filtering through a coarse porosity sintered glass funnel is then done, and the precipitate is washed with a solution of 300 grams of $(NH_4)_2SO_4$ in 500 ml. of water.

Without delay, the product is slurried in a solution of 7.8 grams of $Na_2HPO_4$ and 4.8 grams of $KH_2PO_4$ in 900 ml. of water in a 2-l. beaker. Heating to 85° with constant stirring is then brought about to make a uniform dispersion. The heat is removed and when the temperature has descended to 60°, 40 ml. of dimethyl sulfoxide is added with stirring. Then 630 ml. of methanol is slowly added with constant stirring, which is continued for an additional 10 minutes, whereafter settlement is permitted, with the supernatant being discarded after decanting. The above procedure is repeated for two more times.

Then 500 ml. of methanol is added to the residue. The resultant plastic mass is kneaded occasionally with a stirring rod. Upon prolonged contact with methanol, the mass becomes friable. Pulverization by a mortar and pestle or with a blender is next done. The methanolic suspension is filtered through a coarse or medium porosity sintered glass funnel. Washing on the funnel with 5 additional portions of methanol and then drying in vacuo over $P_2O_5$ completes the procedures. An average yield is about 50 grams.

The substrate also comprehends a buffered diluent which may be preferably a sodium phosphate solution adapted to provide a pH of approximately 6.9. However, a pH within the range of 6.8 to 7.1 has proven satisfactory. In the formation of the buffer, either primary or secondary sodium, potassium, or ammonium phosphates may be used. If desired, there may be substituted for the phosphates certain organic preparations, such as, tris, imidazole, or maleate. A particular buffered diluent which has proven desirable in view of its stability for at least three months at 4° C. is prepared as follows:

Heat to dissolve 8.662 grams of $Na_2HPO_4$, 5.31 grams of $KH_2PO_4$, 10 grams of NaCl, 1.35 grams of methyl p-hydroxybenzoate, and 0.27 gram of propyl p-hydroxybenzoate in 900 ml. of water. The pH is adjusted to 6.9 at 25° C. with NaOH, and then water is added to bring the solution to 1 liter, with mixing.

Understandably, the foregoing merely is exemplary of a buffering agent suitable in the formation of the substrate. However, it is to be understood that buffering agents well-known to those skilled in the art which provides a pH in the above stated range are equally effective. The described buffering agent merely possesses a certain stability productive of a reasonable shelf life and thereby obviates a continuing need for frequent preparation.

To effect the formation of the substrate, 3 grams of the dichloro-s-triazine dyed amylopectin is slowly added, as with magnetic stirring, to 100 ml. of the buffered diluent. The solution is then heated to 85° C. with continual stirring for uniform dispersion. Thereafter, an additional magnetic stirring for a period of 10 minutes is effected and the resultant is filtered through a coarse porosity sintered glass funnel. The filtrate or reagent is stable for a period of about one month at 4° C.

Although the utilization of a protein reagent in analytical procedures involving urine is well-known as for the primary purpose of preventing a so-called protein effect, a particular protein solution has been found most suitable in the present invention in that the same retains its stability for at least one month at 4° C.

This solution is prepared by dissolving bovine albumin and $N_aN_3$ in sodium chloride solution. One particular means for preparing this protein is by dissolving 3 grams of bovine albumin and .025 gram of $N_aN_3$ in 50 ml. of NaCl solution. It is, of course, apparent that such protein may be prepared in numerous manners for the practice of the present method with obvious substitutes for the sodium chloride solution such as sodium sulfate, sodium bromide, potassium chloride, and potassium sulfate.

One of the novel aspects of the present invention is that a two-stage precipitation is effected as distinguished from the customary single precipitating step of methods heretofore known. One of the precipitants is a solution of ethylene glycol monomethyl ether which is the first precipitating agent to be used. This solution may be readily prepared by mixing 400 ml. of water and sufficient ethylene glycol monomethyl ether to make two liters in a volumetric flask. The solution is then allowed to cool and an anti-foaming agent may be added in a small amount, such as in the order of 4 drops. The ethylene glycol monomethyl ether solution is then brought to volume and then mixed to complete homogeneity. The ether and water are in 4 to 1 ratio. This solution is stable and may be stored in a light-resistant bottle.

The second of the precipitants used is zinc sulfate solution wherein 100 grams of $ZnSO \cdot 7H_2O$ per liter of water provides the desired aqueous solution.

Having thus formed the requisite reagents, the present method may then be performed as in the following manner:

1 ml. of the substrate, that is, the buffered dichloro-s-triazine dyed amylopectin, is measured into a 15 ml. centrifuge tube and .2 ml. of the albumin reagent is added thereto. The substrate and the albumin are mixed and the tube then placed in a water bath having a temperature of about 37° C. for at least 3 minutes. Thereafter, .2 ml. of the urine to be tested is pipetted into the tube with appropriate mixture and then the tube is returned to the 37° water bath. After incubating the material within the tube for exactly 10 minutes, 5 ml. of ethylene glycol monomethyl ether is then forcibly blown into the tube with the latter being shaken for the desired intermixture of the ingredients and placed outside the water bath. Thereafter a .2 mil. of the zinc sulfate solution is added to the tube which latter is then shaken vigorously, and then centrifuged for 5 minutes at maximum speed. The absorbance of the solution is then read at the wave length of maximum absorption of the particular dye used and results are reported in dye units.

If the specimen to be tested is blood serum then the procedure is as follows:

1 ml. of substrate is measured into a 15 ml. centrifuge tube, a .2 ml. of water is added thereto and the substrate and water are mixed with the tube being placed in a water bath having a temperature of about 37° C. for at least 3 minutes. Thereafter, .2 ml. of the blood serum to be tested is pipetted into the tube with appropriate mixture and the tube is then returned to the 37° water bath.

---

**This is a trademark of Stein Hall & Company for amylopectin obtained from corn starch.

After incubating the material within the tube for exactly 10 minutes, 5 ml. of ethylene glycol monomethyl ether is then forcibly blown into the tube with the latter being shaken for the desired intermixture of the ingredients and placed outside the water bath. Thereafter, a .2 ml. of the zinc sulfate solution is added to the tube which latter is then shaken vigorously, and then centrifuged for 5 minutes at maximum speed.

The readings as indicated above, are preferably in dye units and with the results yielded demonstrating a more effective discrimination between normal and abnormally elevated serums and urines than in reference procedures such as wherein the unit of measurement is the Somogyi saccharogenic unit. The sensitivity of the present method has been demonstrated by exceedingly close correlation with clinically proven cases. Precision has been fully substantiated by procedures involving measurements through splitting serum and urine specimens with normal and elevated activity; with the analysis of the aliquots in separate runs; and then calculating the standard deviations of the paired results. Twenty specimens, ranging in activity from 37 to 154 dye units (average, 88), had a standard deviation of ±5.5 units and coefficient of variation of ±6.3%. Twenty specimens, ranging from 231 to 2700 units (average, 620), had a standard deviation of 34.2 units and coefficient of variation of ±5.5%.

In enzymatic studies it is, of course, requisite that the reaction be permitted for a specified and predetermined period of time in order that the extent of the reaction per unit time be determined. In the present instance, the time period for the incubation interval is critical to assure the accuracy and significance of the ultimate reading.

The more active the enzyme the greater the amount of starch which will be broken down and carried into solution so that a measurement of such amount is effected through absorbance readings. Without the amylase-containing material, such as urine or serum, etc., the ethylene glycol monomethyl ether and zinc sulfate will effect a precipitation of the dyed amylopectin. Consequently, the greater the enzyme activity the more of the substrate which will be caused to enter into solution with the commensurate relatively increased amount of dye being released for spectrophotometric reading. The reaction is, accordingly, substrate limited since the extent of enzymatic reaction is determined by the quantity of substrate.

From the foregoing, it will be seen that the present method contemplates a two step reagent precipitation technique with the sequential addition of the ethylene glycol monomethyl ether and the zinc sulfate solution. Heretofore a single precipitating agent has been used, such as methanolic tannic acid. However, the various difficulties encountered by the use of such single precipitating reagent have been overcome by the present two-reagent procedure, including avoiding turbidity in the supernatants; providing substantially linear calibration curves; providing constant purity from batch to batch; and assuring of a relatively long shelf life since both the ethylene glycol monomethyl ether and zinc sulfate solution as prepared are stable for a reasonable period of time. The relatively low solubility of the present substrate is not disadvantageous since during incubation no settling of particles is evident and the sensitivity of the assay is relatively high.

Concentrations of constituents of the incubation mixture may effect final absorbance by influencing either the rate of enzyme activity or the solubility of substrate or split products in the precipitants. Measurements of the effect of varying concentrations of each reagent and substance used in the present procedure on final absorbance readings were made. A variation of ±10% in NaCl, the dichloro-s-triazine dyed amylopectin, zinc sulfate solution, albumin, or phosphate concentrations from those specified hereinabove was without significant effect. A variation in the concentration of ethylene glycol monomethyl ether of ±5% was without significant effect, but concentrations therebeyond did have effect on the solubility of intermediate-sized split products, but little on either unreacted or extensively degraded substrate.

Internal constituents within the sera and urine specimens do not cause interference with the accuracy of the results obtained by the present method. An extensive number of specimens, some of which were icteric, hemolyzed, lipemic, as well as urines which were dark, bloody, turbid, or icteric were used to establish the non-interfering aspect of these conditions.

Accordingly, the foregoing provides a novel method for determining amylase activity which permits the development of reagents having relatively long shelf lives and which results in extremely accurate and sensitive readings.

Having thus described our invention what we claim and desire to obtain by Letters Patent is:

1. A method for determining amylase activity comprising providing a substrate comprising a buffered solution of dyed amylopectin, mixing the body fluid to be tested with said substrate, permitting the substrate and the fluid to be tested to incubate for a predetermined period of time, then adding ethylene glycol monomethyl ether to the mixture, then adding a solution of zinc sulfate, and then determining the absorbance of the reacted substrate.

2. A method for determining amylase activity as defined in claim 1 and further characterized by the reactive group of the dye for the amylopectin being dichloro-s-triazine.

3. A method for determining amylase activity as defined in claim 1 and further characterized by said ethylene glycol monomethyl ether being forcibly added to the substrate and human fluid to be tested.

4. A method for determining amylase activity as defined in claim 1 and further characterized by providing a protein solution, adding said protein solution to the substrate before intermixing the fluid to be tested, and wherein said fluid to be tested is urine.

5. A method for determining amylase activity as defined in claim 1 and further characterized by adding water to the substrate before intermixing the fluid to be tested and wherein the fluid to be tested is blood serum.

6. A method for determining amylase activity comprising providing a substrate comprising a buffered solution of dyed amylopectin wherein the reactive group of the dye is dichloro-s-triazine and said solution having a pH within the range of 6.8 to 7.1, placing the substrate in a water bath at a temperature of about 37° C. for a predetermined period of time, intermixing the human fluid to be tested with said substrate, permitting the fluid to be tested and the substrate to incubate for a predetermined period of time, forcibly admitting to said mixture ethylene glycol monomethyl ether, agitating the mixture, and then adding zinc sulfate solution with vigorous shaking, then centrifuging the material for a predetermined period of time at an elevated speed, and then determining the absorbance of the solution.

References Cited

Chemical Abstracts 52:17768e (1959).
Dudman et al., "Can. J. Chem." 46:3079–3084 (1968).
Klein et al., "Clin. Chem." 16:32–38 (1970).
Babson et al., "Clin. Chem." 16:39–43 (1970).

ALVIN E. TANENHOLTZ, Primary Examiner
M. D. HENSLEY, Assistant Examiner